United States Patent
Lim

(10) Patent No.: US 7,099,470 B2
(45) Date of Patent: Aug. 29, 2006

(54) ENCRYPTION APPARATUS USING DATA ENCRYPTION STANDARD ALGORITHM

(75) Inventor: Young-Won Lim, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 956 days.

(21) Appl. No.: 09/878,246

(22) Filed: Jun. 12, 2001

(65) Prior Publication Data

US 2002/0012430 A1    Jan. 31, 2002

(30) Foreign Application Priority Data

Jun. 12, 2000    (KR)    ................ 2000-32173

(51) Int. Cl.
*H04I 9/06*    (2006.01)
(52) U.S. Cl. ........................................ 380/29
(58) Field of Classification Search ............... 380/29, 380/42, 28; 713/200
See application file for complete search history.

(56) References Cited

U.S. PATENT DOCUMENTS 4,825,287 A * 4/1989 Baji et al. ................ 348/720
5,317,638 A    5/1994 Kao et al.
6,578,150 B1 * 6/2003 Luyster ................ 713/200

FOREIGN PATENT DOCUMENTS

| EP | 403 456 A2 | 12/1990 |
| WO | WO 01/17152 A1 | 3/2001 |

OTHER PUBLICATIONS

Lim, "Efficient 8-Cycle DES Implementation," © 2000 IEEE, 0-7803-6470-8, pp. 175-178.

* cited by examiner

*Primary Examiner*—Gregory Morse
*Assistant Examiner*—Andrew L. Nalven
(74) *Attorney, Agent, or Firm*—Pillsbury Winthrop Shaw Pittman LLP

(57) ABSTRACT

An encryption apparatus using a DES encryption algorithm is disclosed. The apparatus for encrypting 64-bit plain text blocks includes: input buffering unit for receiving a plain text block byte-by-byte and outputting a first and a second 32-bit plain text blocks in response to a first clock; encryption unit for performing time multiplexed encryption of the first and the second 32-bit plain text blocks in response to the first clock and a second clock, thereby generating a first and a second 32-bit cipher text blocks; and output buffering unit for receiving the first and the second 32-bit cipher text blocks in response to the second clock and outputting eight 8-bit cipher text blocks.

8 Claims, 12 Drawing Sheets

FIG. 4
(PRIOR ART)
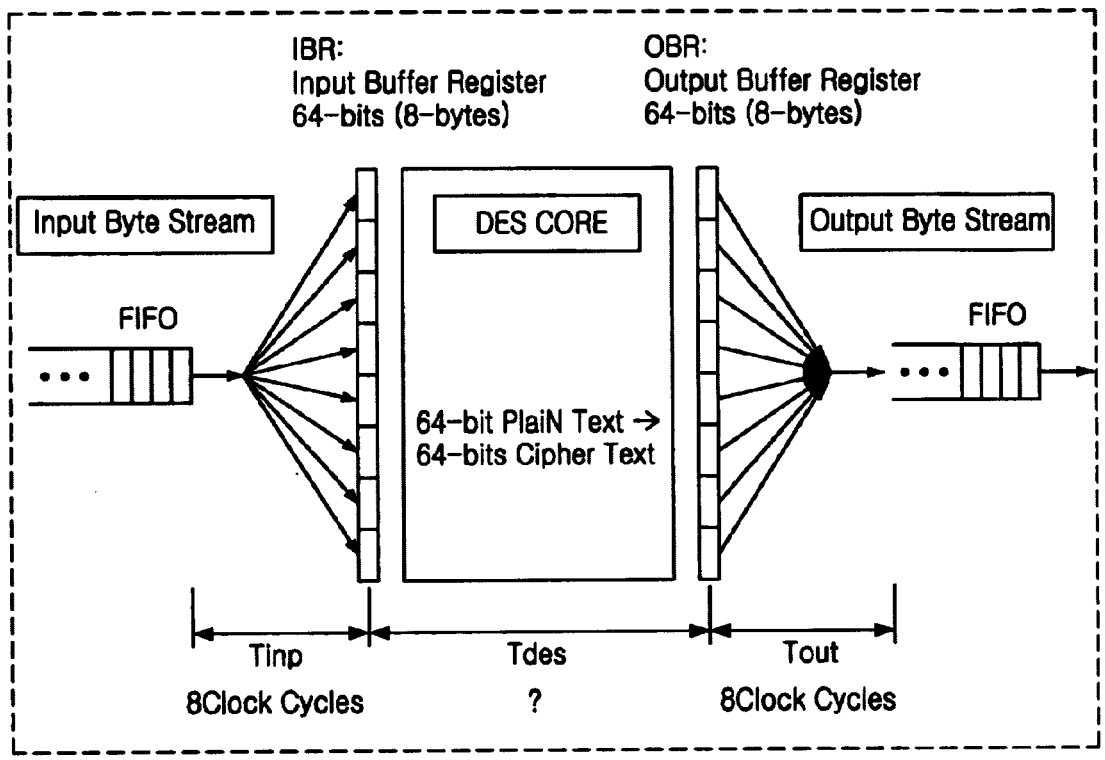
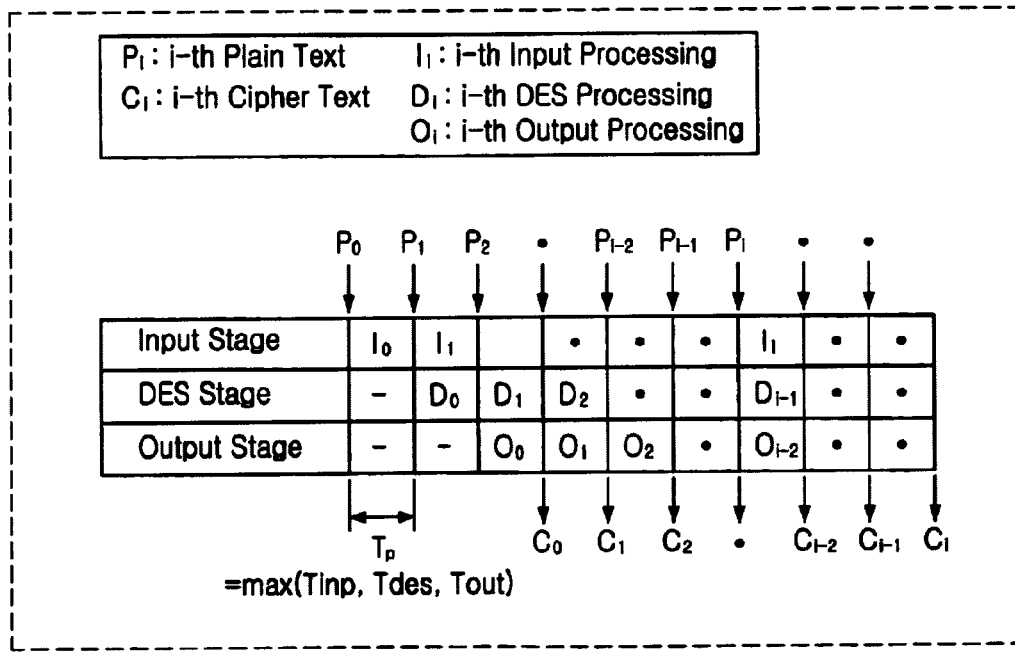

FIG. 5A
(PRIOR ART)
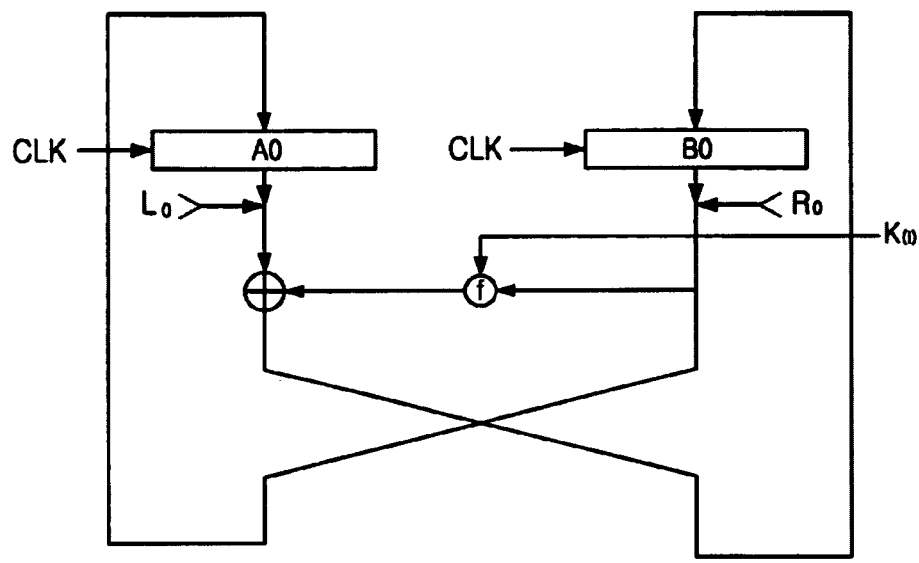
FIG. 5B
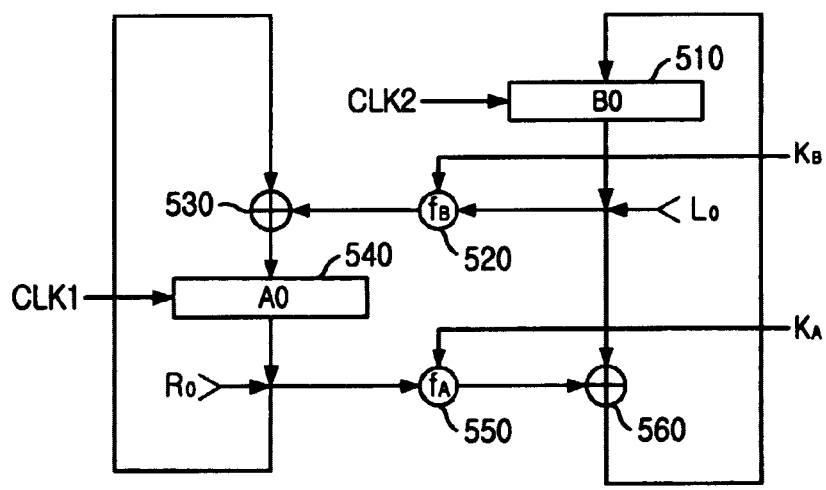
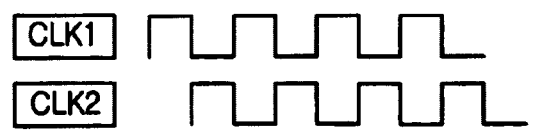

ENCRYPTION APPARATUS USING DATA ENCRYPTION STANDARD ALGORITHM

FIELD OF THE INVENTION

The present invention relates to an encryption apparatus; and, more particularly, to a pipelined encryption apparatus using data encryption standard algorithm.

DESCRIPTION OF THE PRIOR ART

DES (Data Encryption Standard) algorithm has come to the more attention in this environment of the wider usage of networks. Especially, the DES is widely used in Internet security applications, remote access server, cable modem or satellite modem.

The DES is fundamentally a 64-bit block cipher having 64-bit block input and output, 56 bits among the 64-bit key block for encryption and decryption and remaining 8 bits for parity checking the DES receives a 64-bit plain text block and outputs a 64-bit cipher text generated from the 64-bit plain text block and the 56-bit key.

In a major technique, the DES is implemented by permutation (P-Box), substitution (S-Box) and key schedule generating a subkey.

Inside of data encryption is implemented in such a way to iteration of 16 round operations and constructed by an initial permutation (IP) of input part and an inverse initial permutation ($IP^{-1}$) of output part.

FIG. 1 is a block diagram of a general DES architecture.

Referring to FIG. 1, the general DES architecture includes an initial permutation unit 110, a DES encryption unit 120 and an inverse initial permutation unit 130.

In the DES encryption unit 120, 64-bit plain text block undergone an IP unit is divided into two blocks, respectively registered at a first left register ($L_0$) and a first right register ($R_0$). At every round, 32-bit data registered at the left register and the right register undergoes a product transformation and a block transformation. The inverse initial permutation unit 130 performs the inverse initial permutation ($IP^{-1}$) of 64-bit data transformed by 16-round operation and outputs a cipher text block.

The basic operation unit 120 includes a plurality of cipher function units 12 and exclusive-OR (X-OR) units 122.

32-bit data registered at the first right register ($L_0$) is encrypted by the cipher function unit f 121 using the subkey ($K_1$) from a key scheduler and the encrypted 32-bit data is X-ORed with the 32-bit data registered at the first left register ($L_0$) at the X-OR unit 122. 32-bit data from the X-OR unit 122 is registered at a right register ($R_1$) and the 32-bit data registered at the first right register ($R_0$) is swapped and registered at a Left register ($L_1$) in a next round, which is referred as 'one round operation'. In DES architecture, 16 round operations are performed by iteration of one round operation.

16-round operation can be expressed as equation (1) and (2).

$$L_i = R_{i-1}\ I = 1, 2, \ldots 16 \qquad (1)$$

$$R_i = L_{i-1} \oplus f(R_{i-1}, K_i)\ i = 1, 2, \ldots 16 \qquad (2)$$

FIG. 2 is a block diagram of a conventional key scheduler generating a subkey.

Referring to FIG. 2, the conventional key scheduler includes a first permutation choice (PC1) unit 200, a first and a second shift units 220 and 230, and a second permutation choice (PC2) unit 240.

The first permutation choice (PC1) unit 200 performs permutation of 56-bit key data. The permutated 56 bit key data is divided two 28-bit blocks, and the blocks are registered in registers $C_0$ and $D_0$. Each of the shift units 220 and 230 respectively shifts corresponding 28 bits registered in $C_i$ and $D_i$ (i=0, 1, . . . , 15). The shifted key data blocks are registered in a next round registers $C_{i+1}$ and $D_{i+1}$. The second permutation choice (PC2) unit 240 performs permutation of 28-bit blocks registered in the registers $C_i$ and $D_i$ to output a 48-bit subkey $K_i$.

During 16-round operation, the key data blocks of $C_1$ and $D_1$ are shifted by 28 bits, such that the data registered in $C_0$ and $D_0$ are equal to those registered in $C_{16}$ and $D_{16}$.

FIG. 3 is a detailed diagram of a cipher function unit and a S-Box permutation unit of a general DES architecture.

Referring to FIG. 3, the cipher function f includes an expansion permutation unit 310, an exclusive-OR (XOR) unit 320, an S-Box permutation unit 330, a P-Box permutation unit 340 and an XOR unit 350.

The expansion permutation unit 310 performs expansion permutation over 32-bit data ($R_{(i-1)}$) from a right register registering 32-bit text block to output 48-bit data.

The XOR unit 320 performs XOR operation over the 48-bit data from the expansion permutation unit 310 and a subkey ($K_i$) from a key scheduler.

The S-Box permutation unit 330 performs substitution over 48-bit data from the XOR unit 320 to output 32-bit data.

The P-Box permutation unit 340 performs permutation over 32-bit data from the S-Box permutation unit 330.

The XOR unit 350 performs XOR operation over 32-bit data from the P-Box permutation unit 340 and 32-bit data ($L_{(i-1)}$) from a left register.

The key scheduler includes a first permutation choice (PC1) unit 360, two shift units 370 and 380 and a second permutation choice (PC2) unit 380. Each of the shift units 160 and 170 respectively shifts corresponding 28 bits, half of 56-bit key data.

The PC2 unit 390 receives two blocks from the shift units 160 and 170 to compress them to the sub key.

In particular, the S-Box permutation unit 330 includes 8 S-boxes for receiving 48-bit data and outputting 32-bit data. That is, 48-bit data blocks is divided into 8 6-bit data, each applied to the corresponding S-Box of the 8 S-Boxes and each of the 8 S-Boxes outputs 4-bit data. Accordingly, 48-bit data is permutated to 32-bit data. The S-Box permutation unit 330 requires a memory, e.g., a programmable logic array (PLA) or a read only memory (ROM), because it employs table look-up technique. Since each of the S-boxes outputs 4 bits for 6- bit input, it requires 64×4 memory capability and the S-Box permutation unit 130 requires 8×64×4 memory capability. Accordingly, the S-Box permutation unit 330 takes relatively large area in a chip.

Generally, there are lots of data blocks to be encrypted are with compared to a given key in many cases. At this time, performance of encryption can be increased by using a pipeline structure. Pipelines used in the DES architecture are classified as a micro pipeline and a macro pipeline in accordance with a level to which is applied.

The micro pipeline structure is a structure pipelining an iterative 16-round operation of the DES encryption unit, and the micro pipeline structure can be extended up to 16-step. If M-step micro pipeline structure is used, M plain next blocks car be simultaneously encrypted, thereby increasing the throughput of the encryption apparatus by M times. However, since M-round DES operations are simultaneously performed, M S-Box permutation units are necessary in order to prevent data contention problem. Since additional S-Box permutation units are should be implemented, the chip size of the encryption apparatus is increased. Also, the M-step pipeline structure always has a latency of 16 clock cycles.

FIG. 4 is a block diagram of a conventional 3-step macro pipeline DES architecture.

Referring to FIG. 4, the conventional 3-step macro pipeline DES architecture includes three steps.

In a first step, 64-bit data from first-input-first-output (FIFO) register is sequentially inputted to eight (8) input buffer registers (IBR). In a second step, 64-bit plain text block is received from the IBR and performed of encryption operation, thereby outputting 64-bit cipher text. In a third step, the 64-bit cipher text is outputted from eight (8) output buffer registers to a FIFO register.

A period of the macro pipeline is decided in accordance with a maximum time among times for data input, DES operation and data output.

A data input rate to the DES encryption unit is decided based on a speed of the DES encryption unit rather than a speed of the encryption system. In case of DES architecture used for networking, the period of the macro pipeline is decided in accordance with a maximum transmission rate of a modulator and a demodulator, and a speed of an external host microprocessor.

In general, an input/output rate of the DES encryption unit is slow. Since the data in moved byte-by-byte (8 bits) in the external system of the DES encryption unit and the DES encryption unit performs encryption of 64-bit data and outputs encrypted 64-bit data, there are necessary an input register and an output register. The input register gathers eight bytes of input data and transmits the gathered eight byte data to the DES encryption unit. The output register output eight byte data by one byte.

As mentioned above, the conventional micro and macro pipeline architecture has a large size and a slow speed.

SUMMARY OF THE INVENTION

Therefore, it is an object of the present invention to provide an encryption apparatus having a small size, a high speed and minimum power consumption.

In accordance with an aspect of the present invention, there is provided an apparatus for encrypting 64-bit plain text blocks, comprising: input buffering unit for receiving a plain text block byte-by-byte and outputting a first and a second 32-bit plain text blocks in response to a first clock; encryption unit for performing time multiplexed encryption of the first and the second 32-bit plain text blocks in response to the first clock and a second clock, thereby generating a first and a second 32-bit cipher text blocks; and output buffering unit for receiving the first and the second 32-bit cipher text blocks in response to the second clock and outputting eight 8-bit cipher text blocks.

BRIEF DESCRIPTION OF THE DRAWINGS

The above and other objects and features of the instant invention will become apparent from the following description of preferred embodiments taken in conjunction with the accompanying drawings, in which:

FIG. 4 is a block diagram of a conventional 3-step macro pipeline DES architecture;

FIG. 5A is a block diagram of a general DES encryption unit;

FIG. 5B is a block diagram of a 2-step micro pipeline DES architecture;

PREFERRED EMBODIMENT OF THE INVENTION

Hereinafter, preferred embodiments of the present invention will be described in detail with reference to the accompanying drawings.

FIG. 5A is a block diagram of a general DES encryption unit, and FIG. 5B is a block diagram of a 2-step micro pipeline DES architecture.

Referring to FIG. 5A, in a general DES architecture, two 32-bit blocks $L_0$ and $R_0$ which are performed of initial permutation are registered in a left and a right registers in response to a clock. In each round, product transformation and block transformation are performed. The 32-bit block registered in the right register $R_0$ is encrypted by a cipher function f and then X-ORed with the 32-bit block $L_0$ registered in that left register by an exclusive-OR (X-OR) unit, which is referred as the product transformation. 32-bit date from the X-OR unit is swapped with 32-bit data from the right register and registered in the right register, which is referred as the block transformation. In the general DES architecture, there is a problem that 16 clock cycles are necessary for the DES operation because of the input operations to the registers. 32-bit block data can be expressed by equation (3) based on equations (1) and (2).

$$R_i = R_{i-2} \oplus f(R_{i-1}, K_i) \quad i=1, 2, \ldots 16 \tag{3}$$

Figure 1:
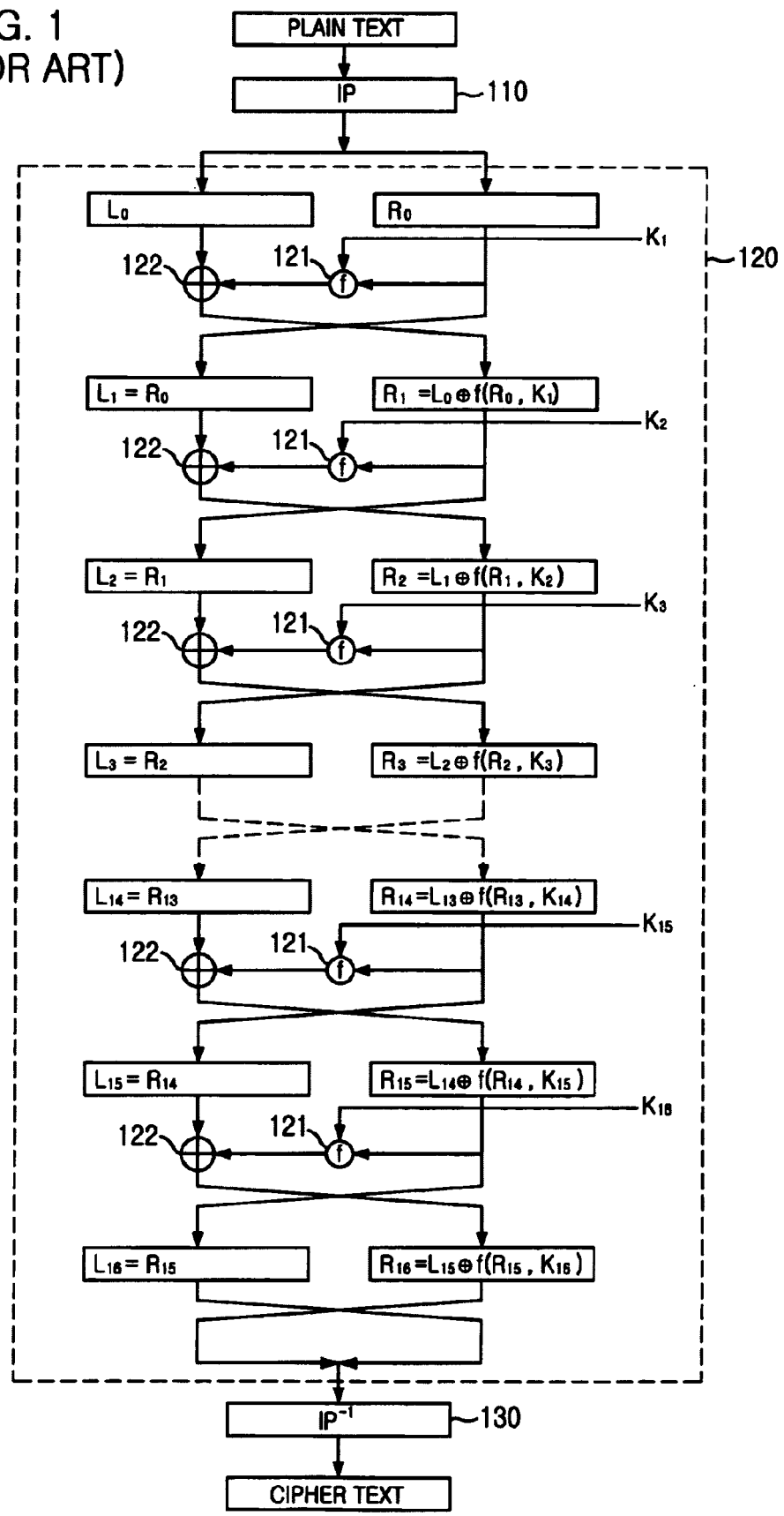
FIG. 1 is a block diagram of a general DES architecture.
Figure 2:
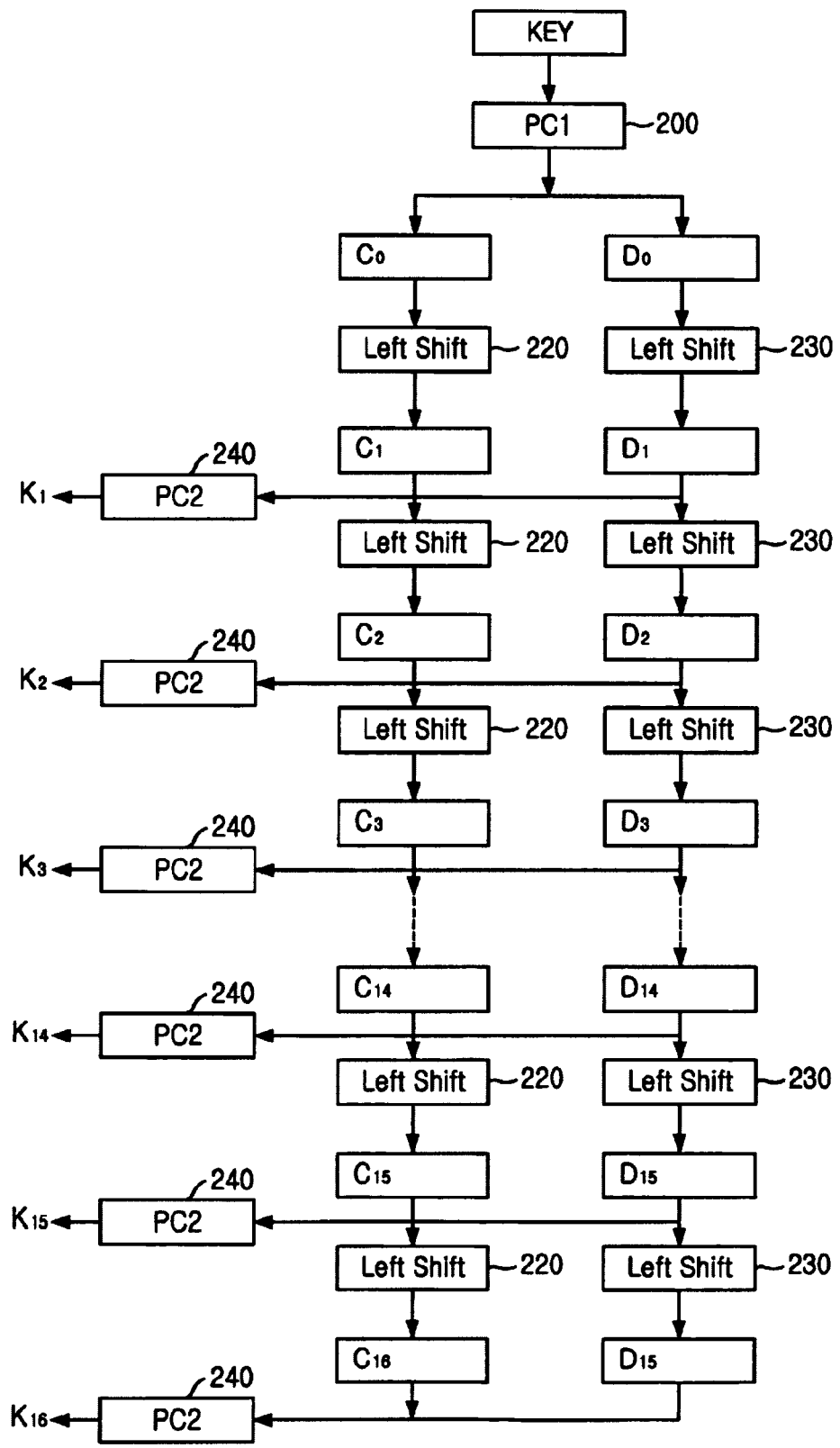
FIG. 2 is block diagram of a conventional key scheduler generating a subkey.
Figure 3:
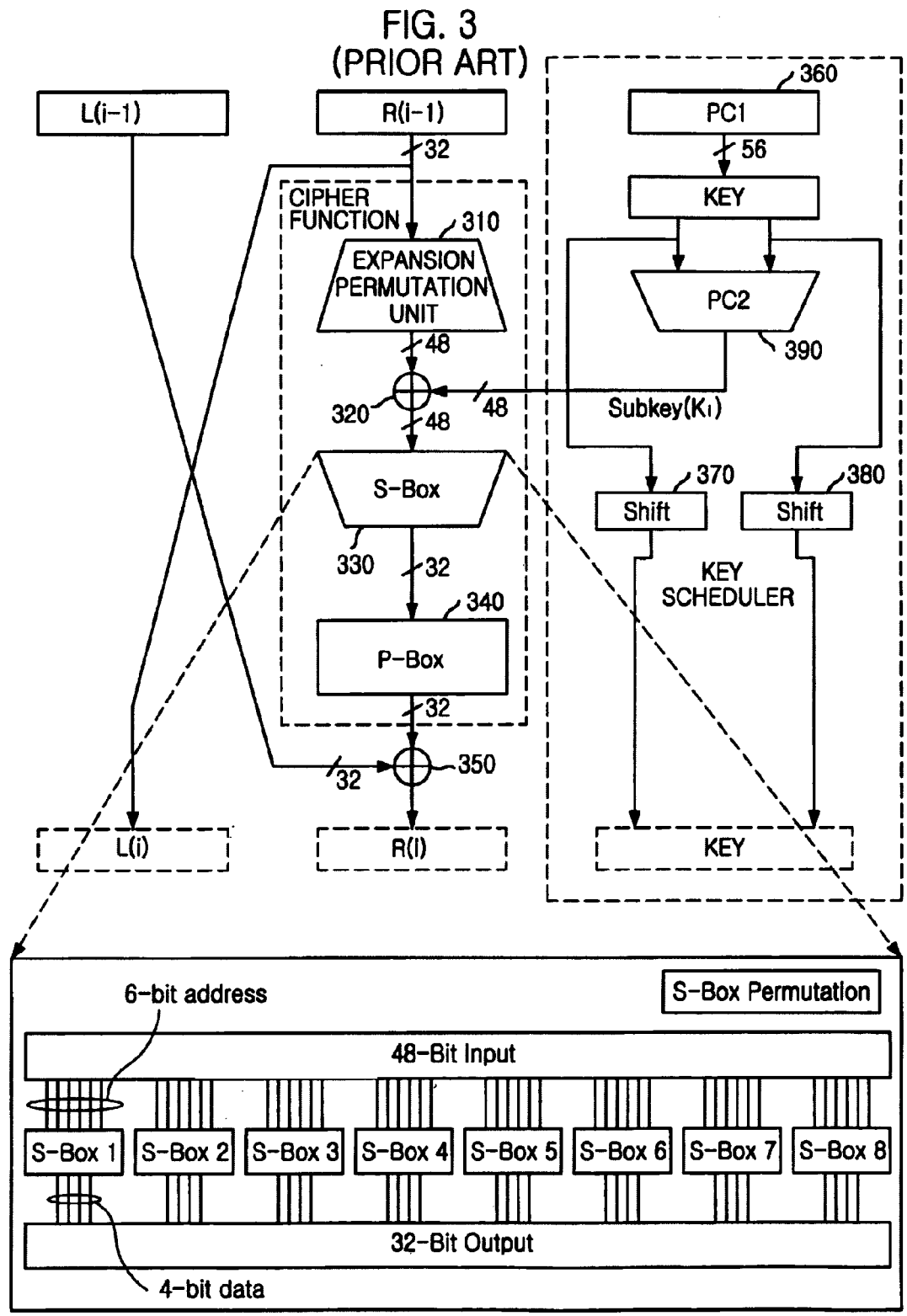
FIG. 3 is a block diagram of a cipher function unit and a S-Box permutation unit of a general DES architecture.

Referring to FIG. 5B, 2-step micro pipeline DES architecture includes two steps. In a first step, an initial 32-bit block $R_0$ is encrypted by a cipher function $f_A$ 550 using a subkey $K_A$ from a key scheduler and the encrypted 32-bit data is X-Ored with an initial 32-bit block $L_0$. 32-bit data $R_1$ from the X-OR unit 560 is registered at a right register B0 510 in response to a first clock (CLK2). In a second step, the 32-bit data block registered in the right register B0 is encrypted by a cipher function $f_B$ 520 using a sub-key $K_B$ from the key scheduler and the encrypted 32-bit data is X-Ored with the initial 32-bit block $R_0$. 32-bit data $R_2$ from the X-OR unit 530 is registered at a left register A0 540 in response to a second clock (CLK1).

In the 2-step micro pipeline DES architecture, since encryption operations are performed based on the equation (3), the 32-bit blocks are registered in response to two clocks, in one period for which one register maintains the registered values, the other register can register a new value. In other words, for one period, one register maintains a value and the other register can register a new value. If values of permutations $R_i$ (i–1, 2, . . . 16) are alternatively stored two registers, adjacent values of $R_1$ can be accessed for a half of a period. Since the values $R_{i-1}$ and $R_{i-2}$ computed in the previous rounds can be accessed within a half of one period, in order to alternatively store the values of $R_i$ computed by the equation (3), the cipher function operation should be performed within a half of one period. In other words, two cipher function units are time-multiplexed in one period, two cipher function units can be implemented by using a S-Box permutation unit.

Referring to FIG. 5B, the micro pipeline DES includes two registers of which clocks are inverse and a time multiplexed cipher function unit. The micro pipeline DES does not simultaneously encrypt two plain text blocks, however, reduces a number of clocks necessary for encrypting one plain text block, thereby minimizing power consumption of the DES chip. Since one S-Box permutation unit is used, the micro pipeline DES has small size similar to the DES architecture of FIG. 5A.

Figure 6:
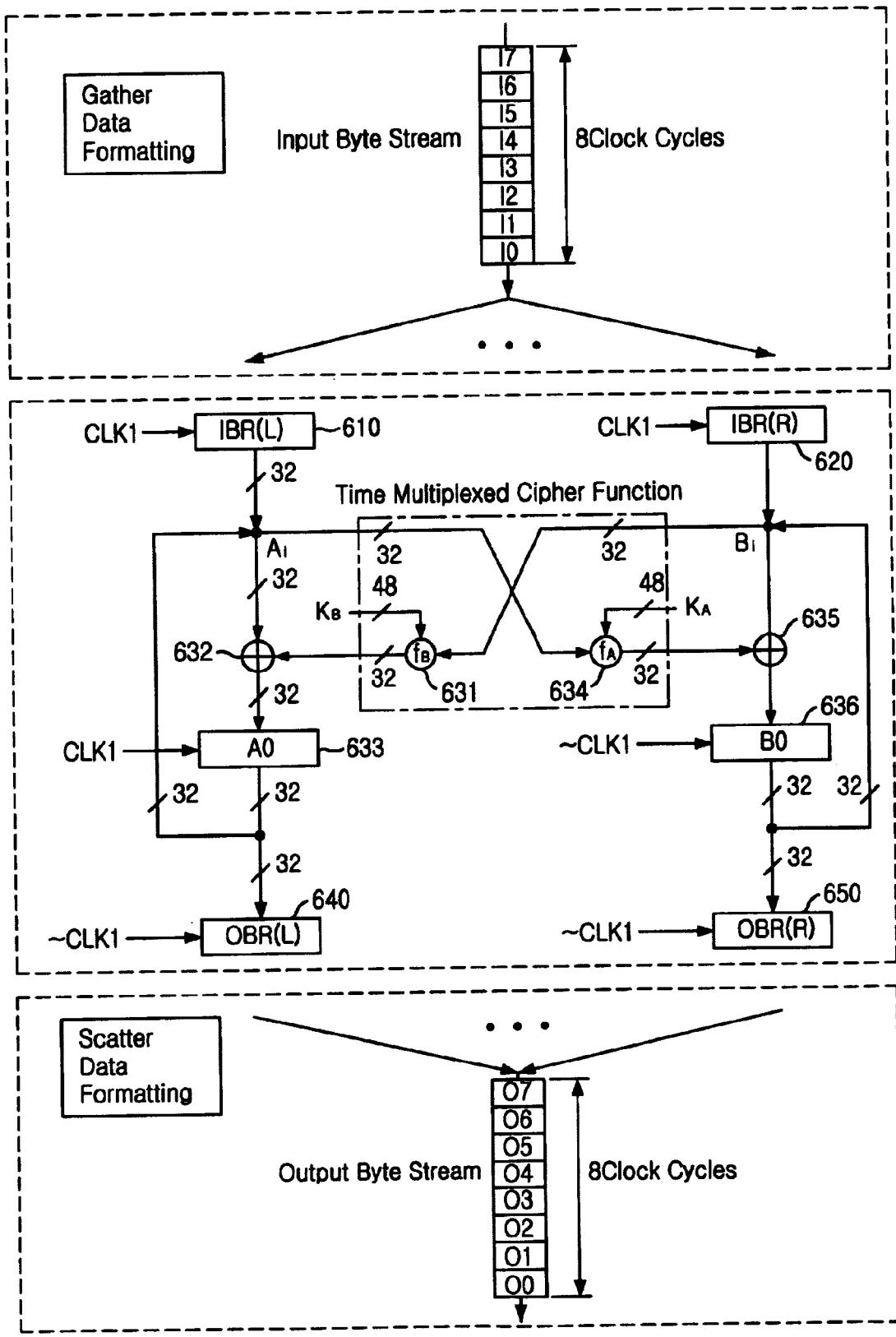
FIG. 6 is a block diagram of DES architecture using a macro pipeline and a micro pipeline architectures in accordance with the present invention.

FIG. 6 is a block diagram of DES architecture using a macro pipeline and a micro pipeline architectures in accordance with the present invention.

Referring to FIG. 6, the macro pipeline includes three steps. In a first step, 64-bit input data block is divided into eight 8-bit blocks, every four 8-bit blocks are sequentially inputted, gathered and stored into a left input buffer register (IBR(L)) 610 and a right input buffer register (IBR(R)) 620. In a second step, each 32-bit data block from the left and the right input buffer registers is alternatively inputted to a first and a second cipher function units and encrypted for 8 rounds. In a third step, each 32-bit data block is divided into four 8-bit blocks and outputted by 8-bit block through a left output buffer register (OBR(L)) 640 and a right output buffer register OBR(R)) 650.

In more detail description of the second step, 32-bit data block $A_i$ registered in the left input buffer register (IBR(L)) 610 is encrypted by the cipher function ($f_A$) 634 using the sub-key $K_A$ from the key scheduler, the encrypted data block is X-ORed with the 32-bit data block $B_i$ registered in the right input buffer register 620 by a X-OR unit 635. 32-bit data from the X-OR unit 635 is registered in a right register (B0), 636 in response to a second clock (~CLK). 32-bit data block $B_i$ registered in the right input buffer register (IBR(R)) 620 is encrypted by the cipher function ($f_B$) 631 using the sub-key $K_B$ from the key scheduler, the encrypted data block is X-ORed with the 32-bit data block $A_i$ registered in the left input buffer register 610 by a X-OR unit 632. 32-bit data from the X-OR unit 632 is registered in a left register (A0) 633 in response to a first clock (CLK).

While data input/output Is performed 64-bit by 64-bit in the DES encryption unit, data input/output in outside of the DES encryption unit is performed 8-bit by 8-bit out of the DES encryption unit. Latencies due to input/output into/from the DES encryption, unit can be hidden by using 3-step macro pipeline DES architecture.

While the conventional DES architecture illustrated in FIG. 5A respectively computes and stores $R_i$ and $L_i$ in two registers 16 times, the DES architecture in the present invention computes only $R_i$ and alternatively stores $R_i$ in two registers. In other words, each register stores $R_i$ only eight times. The input of the register A0 is IBR(L)⊕ $f_A$ or A0⊕ $f_B$, and the output of the register A0 is used for operation A0⊕ $f_B$ or stored in the register OBR(L). Output of the register B0 is used for operation B0⊕ $f_A$ or stored in the register OBR(R).

Figure 7:
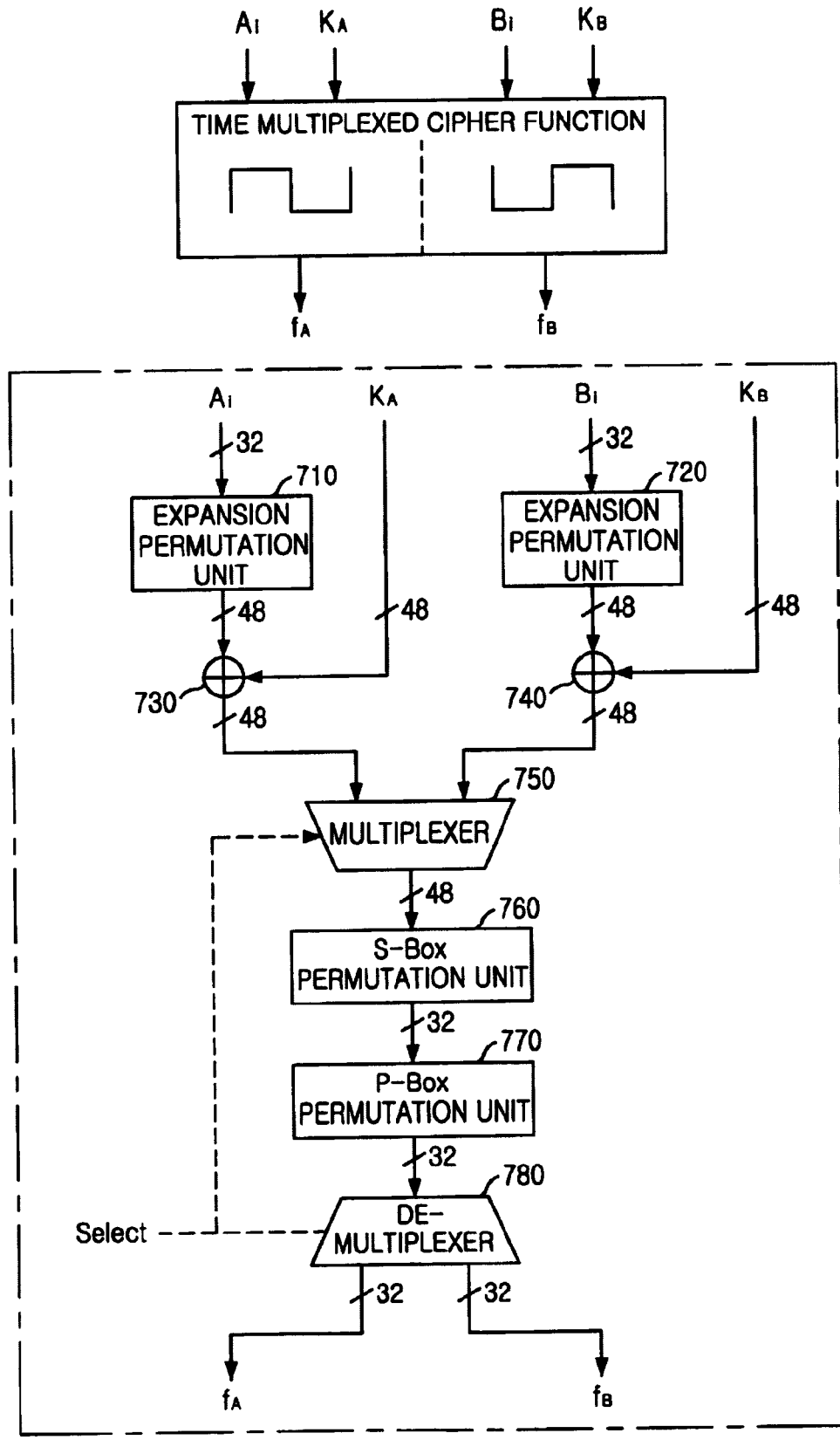
FIG. 7 is a detailed block diagram of a time multiplexed cipher function unit in accordance with the present invention.

FIG. 7 is a detailed block diagram of a time multiplexed cipher function unit in accordance with the present invention.

Referring to FIG. 7, a time multiplexed cipher function unit includes two expansion permutation units 710 and 720, two exclusive-OR (X-OR) units 730 and 740, a multiplexer 750, a S-Box permutation unit 760, a P-Box permutation unit 770 and a demultiplexer 780.

A 32-bit data block $A_i$ is expanded to 48-bit block by the first expansion permutation unit 710. The 48-bit block is X-ORed with a subkey $K_A$ from the key scheduler by the X-OR unit 730. A 32-bit data block $B_i$ is expanded to 48-bit block by the second expansion permutation unit 720. The 48-bit block is X-ORed with a subkey $K_L$ from the key scheduler by the X-OR unit 740. One of the 48-bit blocks from the X-OR units 720 and 740, is selected by the multiplexer 750 based on a selection signal. The 48-bit data block is stored in and substituted into 32-bit data block by the S-Box permutation unit 760. The 32-bit data block from the S-Box permutation unit 760 is permutated by the P-Box permutation unit 770. The 32-bit data block from the P-Box permutation unit 770 is outputted by the demultiplexer 780 based on the selection signal.

The multiplexer 750 and the demultiplexer 780 operated based on the selection signal output 32-bit data $f_A$ at a first half period of the first clock (CLK1) and 32-bit data $f_B$ at a second half period of the first clock (CLK1). In other words, the time multiplexed cipher function unit receives and performs cipher function of 32-bit data $A_i$ and the sub-key $K_A$ and outputs $f_A$ for the first half period of the first clock (CLK1) by using the expansion permutation unit 710, the X-OR unit 730, the S-Box 760 and the P-Box 770. The time multiplexed cipher function unit receives and performs cipher function of 32-bit data $B_i$ and the sub-key $K_L$ and outputs $f_B$ for the second half period of the first clock (CLK1) by using the expansion permutation unit 720, the X-OR unit 740, the S-box 760 and the P-Box 770. The expansion permutation units 710 and 720 are implemented by wiring and the S-Box permutation unit 760 is by a read only memory (ROM) or a programmable logic array (PLA). In the DES apparatus of the present invention, two cipher functions in the time multiplexed cipher function unit are operated for one period by using one S-Box permutation unit.

Figure 8:
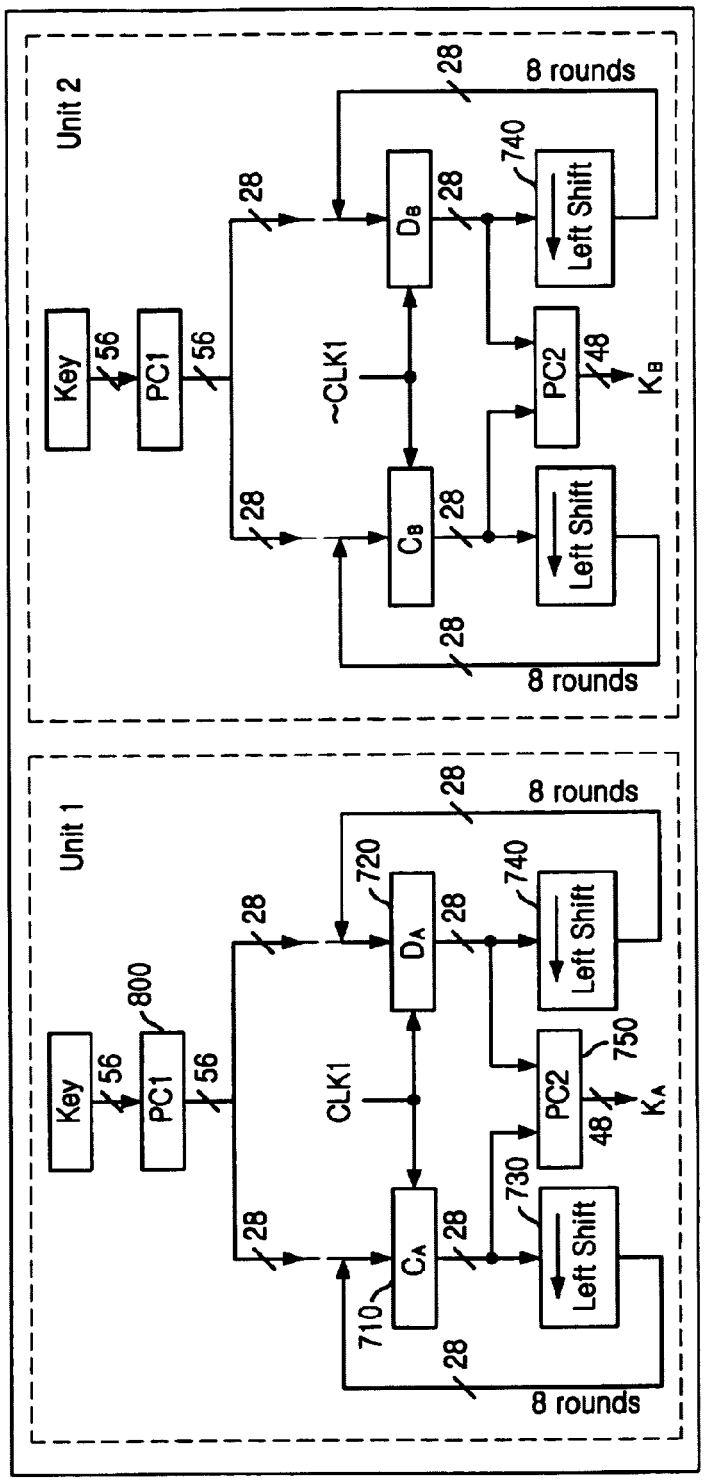
FIG. 8 is a block diagram of a key scheduler of the time multiplexed cipher function unit in accordance with the present invention.

FIG. 8 is a block diagram of a key scheduler of the time multiplexed cipher function unit in accordance with the present invention.

Referring to FIG. 8, the key scheduler of the time multiplexed cipher function unit includes two key scheduling units each having a first permutation choice (PC1) unit 800, two registers 810 and 820, shift units 830 and 840, and a second permutation choice (PC2) unit 850.

In a first key scheduling unit, the PC1 unit 800 performs permutation of 56-bit key data. Each of registers ($C_A$) 810 and ($D_A$) 820 stores 28 bits, half of 56-bit key data in response to a first clock (CLK1). Each of the shift units 830 and 840 respectively shifts corresponding the 28-bit key data from the registers by a predetermined number of bits, e.g., two, three, or four bits. The second permutation choice unit 850 receives two 28-bit key blocks and generates a first subkey $K_A$.

A second key scheduling unit has the same elements as the first key scheduling unit, however, each element is operated in response to a second clock (~CLK1).

The number of shifted bits in the shift units 830 and 840 at each round is described in tables of FIG. 8.

The key scheduling unit includes two shifters and registers and the PC1 and PC2 units 800 and 850 implemented by wiring. Since a size of an additional 56-bit register is very small as compared with that of the S-Box permutation unit, the additional 56-bit register takes relatively small area in a chip. Accordingly, the additional 56-bit register is not critical problem in integrating the encryption apparatus in a chip.

Figure 9:
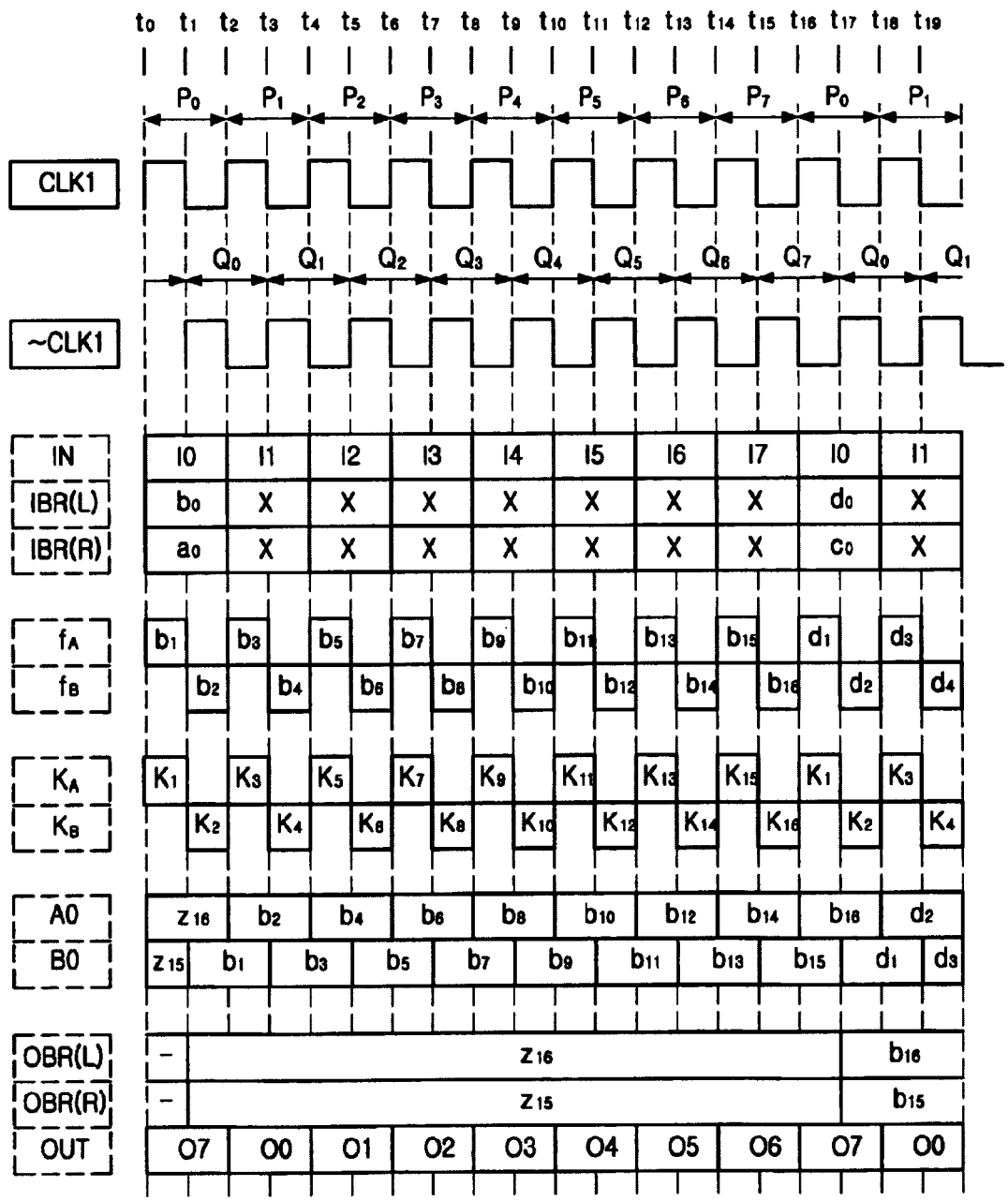
FIG. 9 is a timing diagram for explaining operation of the DES architecture having the macro pipeline and the micro pipeline structures in accordance with the present invention.

FIG. 9 is a timing diagram for explaining operation of the DES architecture having the macro pipeline and the micro pipeline structures in accordance with the present invention.

Referring to FIG. 9, the DES architecture receives initial permuted plain test $(y_0, z_0)$, $(a_0, b_0)$, $(c_0, d_0)$ in order and computed $z_i, b_i, d_i$ (i=1, 2, ... 16) and outputs $(z_{16}, z_{15})$, $(b_{16}, b_{15})$, $(d_{16}, d_{15})$.

For easy description, only process of computing $b_i$ from $(a_0, b_0)$ and outputting $(b_{16}, b_{15})$ will be described. 64-bit plain text after initial permutation is divided into two 32-bit blocks $a_0$, and $b_0$. In other words, $a_0 = L_0 = R_{-1}$, and $b_0 = R_0$. The DES encryption unit computes values $b_1, b_2, \ldots, b_{16}$ ($b_i = R_i$). Before computing $b_i$, a subkey $K_i$ is provided to a cipher function unit from a key scheduler.

For sight cycles before $t_0$, data which is inputted byte-by-byte is gathered in the input buffer register (IBR). The left buffer register (IBR(L)) remains $b_0$ and the right buffer register (IBR(R)) remains $a_0$ at $[t_0-t_2]$. At a next clock, each of the input buffer registers gathers one byte of a next plain text block $c_0$ and $d_0$. After eight clocks, the input buffer registers remain $c_0$ and $d_0$ at $[t_{16}-t_{18}]$.

The output buffer registers (OBR) load from $z_{16}$ and $z_{15}$ from A0 and B0 at $t_1$, and output the inverse permuted data block at $t_1$ byte-by-byte for 8 cycles.

$a_0$ and $b_0$ registered in the input buffer register (IBR) can be accessed at $[t_0-t_1]$, the cipher function $f_A$ is computed at $[t_0-t_1]$ by using the subkey $K_A$ from the key scheduler, $b_1 = a_0 \oplus f(b_0, K_1)$ can be stored in the register 30 at $t_1$.

Since $b_0$ and $b_1$ registered in the IBR(L) and B0 can be accessed at $[t_1-t_2]$, the cipher function $f_B$ in computed at $[t_1-t_2]$ by using the subkey $K_2$ from output $K_B$ of the key scheduler, $b_2 = b_0 \oplus f(b_1, K_2)$ can be stored in the register A0 at $t_2$.

Since $b_1$ and $b_2$ registered in the B0 and A0 can be accessed at $[t_2-t_3]$, the cipher function $f_A$ is computed at $[t_2-t_3]$ by using the subkey $K_3$ from output $K_A$ of the key scheduler, $b_3 = b_1 \oplus f(b_2, K_3)$ can be stored in the register B0 at $t_3$.

Computation of $b_1$ is started at $t_0$, and then, each of $b_2, b_3, \ldots, b_{15}$ is computed and stored at the corresponding register. After eight clocks, $b_{16}$ is stored in the register A0 at $t_{16}$, thereby terminating DES operation of $a_0$ and $b_0$. Simultaneously, DES operation of $c_0$ and $d_0$ is performed at $t_{16}$.

The subkey $K_i$ (i=1, 2, ..., 16) is 48-bit block generated by dividing the 56-bit initial key data from the first permutation choice (PC1) unit into two 28-bit blocks, by shifting each of the 28-bit blocks by 1, 2, 4, 6, 8, 10, 12, 14, 15, 17, 19, 21, 23, 25, 27, 28 (=0) bit(s), and by permuting the shifted blocks in the second permutation choice (PC2) unit.

In the present invention, since the cipher function performs a time multiplexed operation, two cipher functions are operated and two subkeys are generated for a period. In order to generate two subkeys for one period, two key scheduling units each performing having 8-round operation of FIG. 8 are used. A first key scheduling unit is driven in response to the first clock (CLK1) and generates $K_1, K_3, K_5, K_7, K_9, K_{11}, K_{13}, K_{15}$ for 8 rounds, a second key scheduling unit is driven in response to the second clock (CLK2) and generates $K_2, K_4, K_6, K_8, K_{10}, K_{12}, K_{14}, K_{16}$ for 8 rounds.

Figure 10:
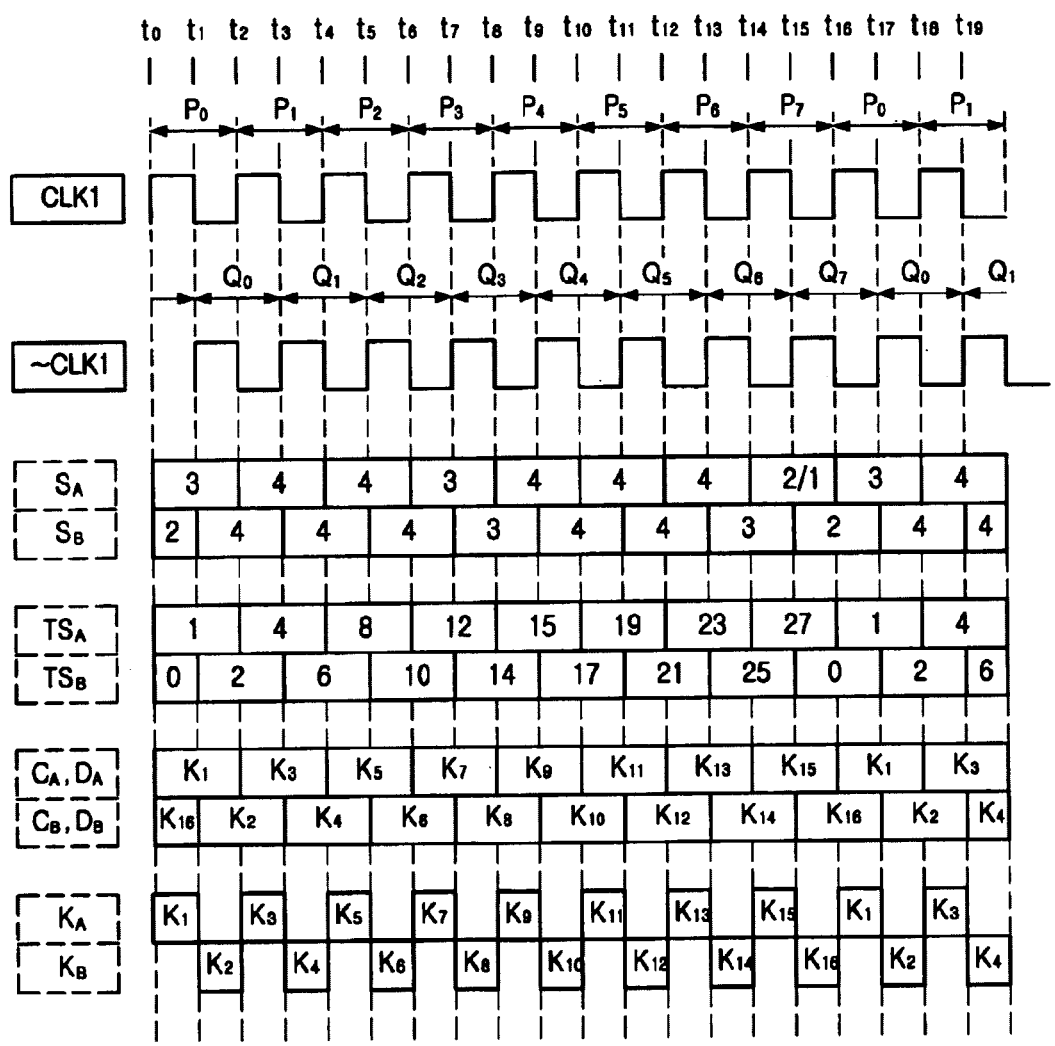
FIG. 10 is a timing diagram for explaining operation of the key scheduler of the time multiplexed cipher function in accordance with the present invention.

FIG. 10 is a timing diagram for explaining operation of the key scheduler of the time multiplexed cipher function in accordance with the present invention.

Referring to FIG. 10, $K_A$ and $K_B$ denote access times to the subkeys necessary for the time multiplexed cipher function units. $TS_A$ and $TS_B$ denote numbers of shifted bits of the initial key block after the first permutation choice unit (PC1) $(C_A, D_A)$ and $(C_B, D_B)$ denote the subkeys obtained by permuting output data blocks of the registers $C_A, D_A$ and $C_B, D_B$ through the second permutation choice unit (PC2). $S_A$ and $S_B$ denote numbers of shifted bits in each round $(P_1, Q_1)$ in order to obtain the total numbers of shifted bits described in $TS_A$ and $TS_B$.

Processes for generating the subkey will be described.

In a first round $(P_0, Q_0)$, since $TS_A$ and $TS_B$ are 1 and 2, the subkeys $K_1$ and $K_2$ are generated by shifting the initial key from the PC1 by one and two bits and permuting the shifted key blocks through the PC2.

In a second round $(P_1, Q_1)$, since $TS_A$ and $TS_B$ are 4 and 6, in order to generate the subkeys $K_3$ and $K_4$, the left shifters shift the key blocks stored in the corresponding registers to left by 3 (=4−1) and 4 (=6−2) bits.

In a third round $(P_2, Q_2)$, since $TS_A$ and $TS_B$ are 8 and 10, in order to generate the subkeys $K_5$ and $K_6$, the left shifters shift the key blocks stored in the corresponding registers to left by 4 (=8−4) and 4 (=10−6) bits.

In each round $(P_i, Q_i)$, the key blocks stored in the corresponding registers are shifted to left by $S_A$ and $S_B$ bits, and the key blocks are shifted by $TS_A$=27 and $TS_B$=28 (=0) in the eighth round $(P_7, Q_7)$. Then, in order to return to the first round, i.e., $TS_A$=1 and $TS_B$=2, $S_A$ and $S_B$ should be two (2) respectively. However, in case that initial DES operation is performed or the initial key is stored in the registers $C_A$ and $D_A$ after a reset of system, $S_A$ is one (1).

Figure 11:
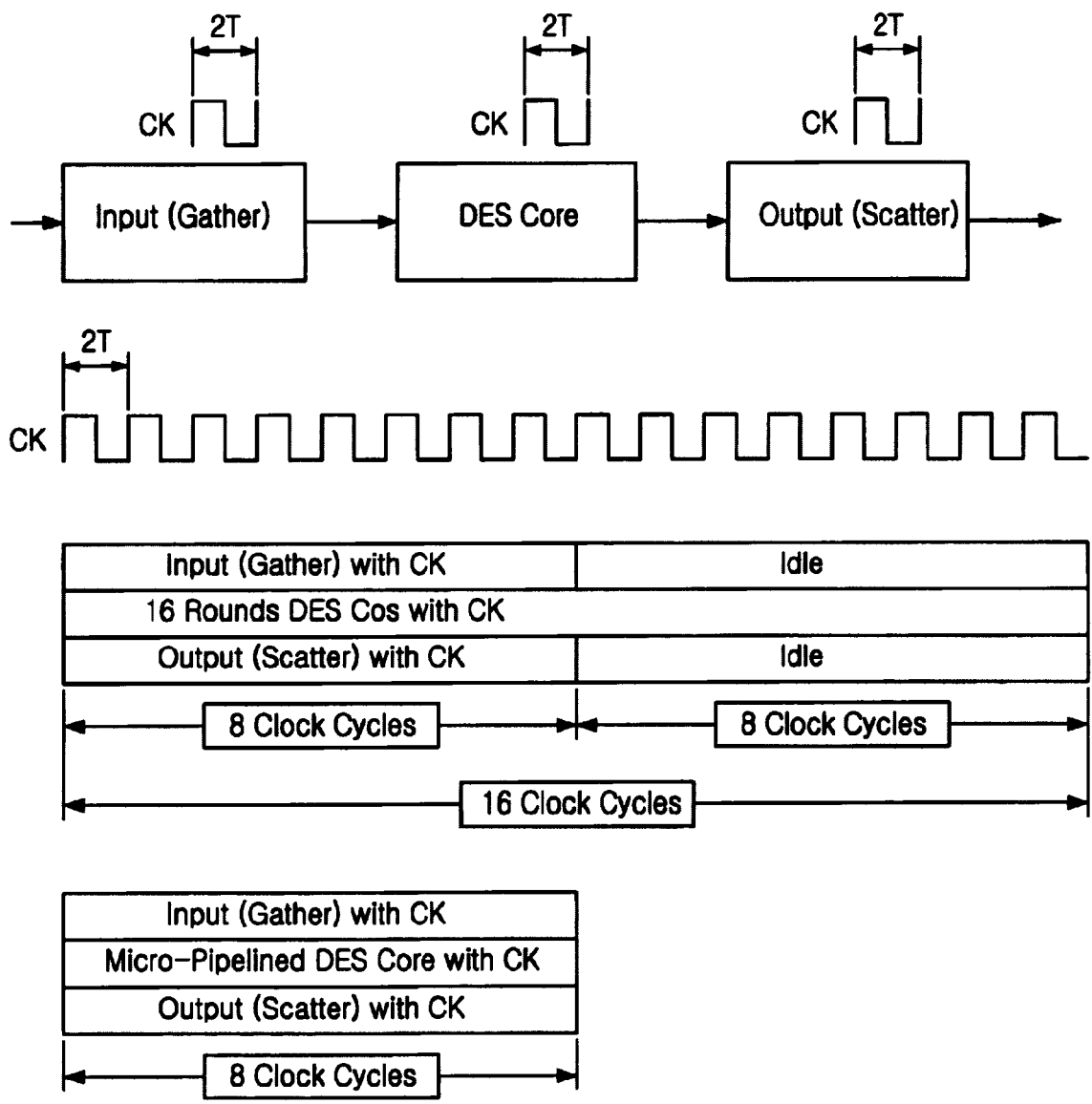
FIG. 11 is a timing diagram for explaining operation of the conventional 16-round DES architecture and the 8-round DES architecture of the present invention.

FIG. 11 is a timing diagram for explaining operation of the conventional 16-round DES architecture and the 8-round DES architecture of the present invention.

Referring to FIG. 11, the DES encryption apparatus of the present invention performs operations faster than the conventional DES encryption apparatus.

Figure 12:
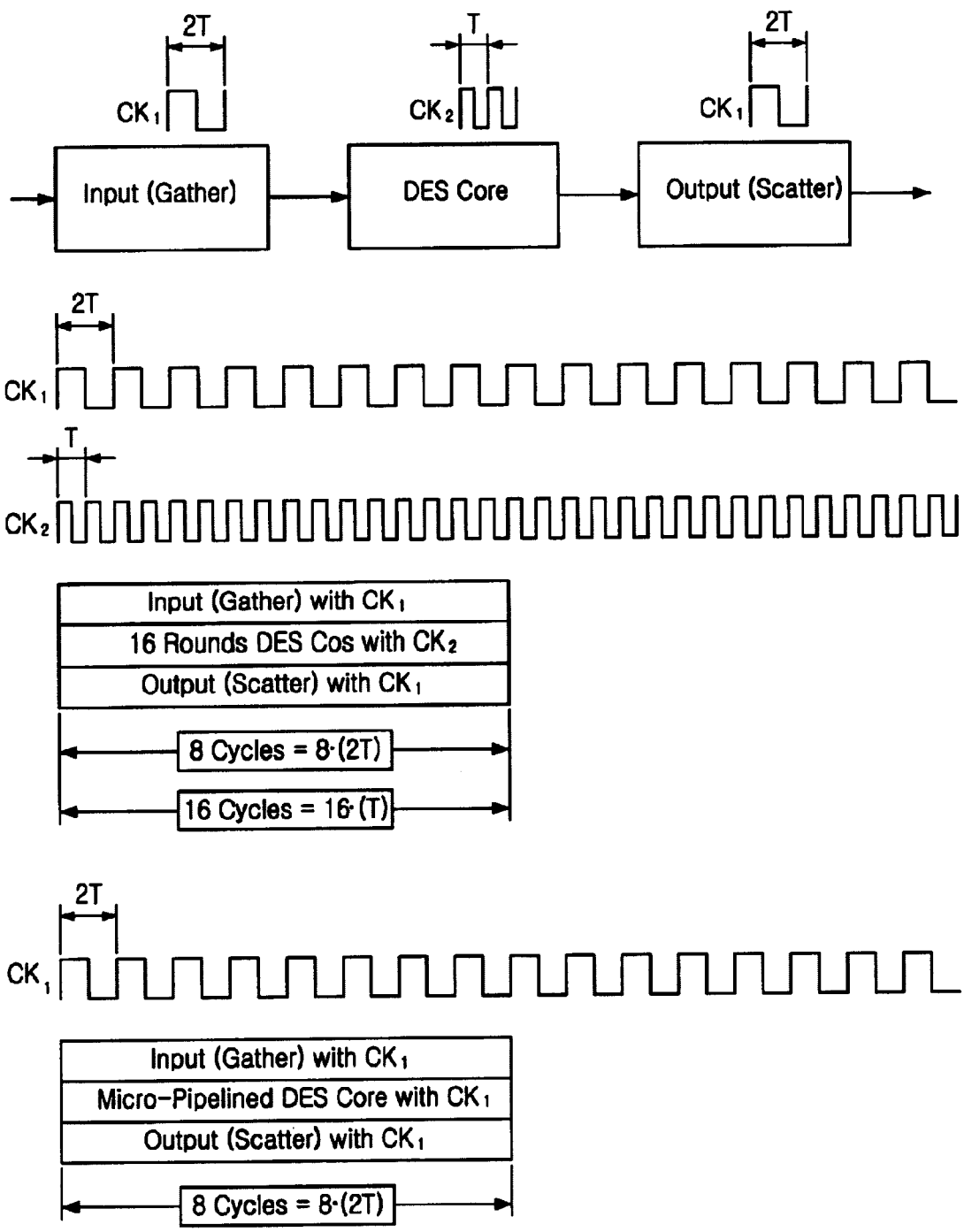
FIG. 12 is a timing diagram for explaining performance of the conventional 16-round DES architecture and the 8-round DES architecture of the present invention.

FIG. 12 is a timing diagram for explaining performance of the conventional 16-round DES architecture and the 8-round DES architecture of the present invention.

Referring to FIG. 12, the 8-round DES architecture of the present invention can reduce power consumption.

The architecture of the present invention can be extended. For example, 2N-step micro pipeline architecture can be implemented by combining N two-step micro pipeline architectures in serial. The extended architecture includes N cipher function units which are not time multiplexed, N S-Box permutation units are necessary, however, N plain text blocks can be simultaneously encrypted for 8 rounds. In other words, the throughput of the encryption apparatus is increased by N times.

M-step micro pipeline architecture can be implemented by combining M micro pipeline architectures of FIG. 5B in serial. The extended architecture should have M S-Box permutation units, M plain text blocks can be simultaneously encrypted for 16 rounds. In other words, the throughput of the encryption apparatus is increased by M times.

Comparison of four architectures are described in table 1.

TABLE 1

|  | Latency (cycle) | through-put | S-Box permutation unit | Core register |
|---|---|---|---|---|
| virtual 2-step pipeline | 8 | 1 | 1 | 2 |
| general 1-step pipeline | 16 | 1 | 1 | 2 |
| virtual 4-step pipeline | 8 | 2 | 2 | 4 |
| general 2-step pipeline | 16 | 2 | 2 | 4 |
| virtual 8-step pipeline | 8 | 4 | 4 | 8 |
| general 4-step pipeline | 16 | 4 | 4 | 8 |
| virtual 16-step pipeline | 8 | 8 | 8 | 16 |
| general 8-step pipeline | 16 | 8 | 8 | 16 |

As described above, in the present invention, by using 2-step pipeline architecture, values of 16 registers are computed and alternatively stored in the corresponding registers, and therefore, DES encryption operation is reduced from 16 rounds to 8 rounds, thereby reducing power consumption due to switching. Using 3-step macro pipeline architecture having input, DES encryption operation and output, latency due to low rate data input/output can be hidden into DES operation time, to thereby increase efficiency of macro pipeline. Since only one S-Box permutation unit is used by time dividing the cipher function unit, size of the encryption chip is minimized. The number of plain text blocks which are simultaneously encrypted is increased by extending the pipeline architecture. The encryption apparatus of the present invention reduces the power consumption by using the slower clock than that of the conventional encryption apparatus by two times. Therefore, the encryption apparatus has a small size and a low consumption.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for encrypting N-bit plain text blocks, comprising:
   input means for receiving a plain text block byte-by-byte and outputting first and second N/2-bit plain text blocks in response to a first clock;
   encryption means for performing time multiplexed encryption of the first N/2-bit plain text block by using the first clock and time multiplexed encryption of the second N/2-bit plain text block by using a second clock to thereby generate first and second N/2-bit cipher text blocks; and
   output means for receiving the first and the second N/2-bit cipher text blocks in response to the second clock and outputting N/8-bit cipher text blocks, wherein N is a positive integer.

2. The apparatus as recited in claim 1, wherein the positive integer N is 64.

3. The apparatus as recited in claim 2, wherein the encryption means includes:
   a cipher function unit for receiving the first and the second 32-bit plain text blocks from the input means in response to the first clock, encrypting the first and the second 32-bit plain text blocks using a first a subkey and a second subkey, respectively, and outputting a first encrypted 32-bit block in response to the first clock and a second encrypted 32-bit block in response to the second clock;
   a first XOR Unit for performing XOR operation of the first encrypted 32-bit block and the second 32-bit plain text, thereby generating a first encrypted block;
   a second XOR unit for performing XOR operation of the second encrypted 32-bit block and the first 32-bit plain text, thereby generating a second cipher block;
   a left register for storing the second cipher block and outputting the second cipher block to the cipher function unit in response to the first clock; and
   a right register for storing the first cipher block and outputting the first cipher block to the cipher function unit in response to the second clock.

4. The apparatus as recited in claim 3, wherein the second clock is an inverse signal of the first clock.

5. The apparatus as recited in claim 3, wherein the cipher function unit includes:
   a first expansion permutation unit for performing an expansion permutation of the left 32-bit plain text block to generate a first 48-bit block;
   a second expansion permutation unit for performing an expansion permutation of the right 32-bit plain text block to generate a second 48-bit block;
   a third XOR unit for performing XOR operation of the first 48-hit block and the first subkey from a key scheduler, thereby generating a first XORed 48-bit block;
   a fourth XOR unit for performing XOR operation of the second 48-bit block and the second subkey from the key scheduler, thereby generating a second XORed 48-bit block;
   a multiplexer for selecting one of the first and the second XORed 48-bit blocks and outputting a XORed 48-bit block in accordance a control signal;
   a S-Box permutation unit for receiving the XORed 48-bit block from the multiplexer and outputting 32-bit data block;
   a P-Box permutation unit for permuting the 32-bit data block from the S-Box permutation unit to generate a permuted 32-bit block; and
   a demultiplexer for outputting the permuted 32-bit block to one of two output ports in accordance with the control signal.

6. The apparatus as recited in claim 5, wherein the key scheduler includes:
   a first scheduling means for receiving a 56-bit key block and generating the first subkey in accordance with the first clock; and
   a second scheduling means for receiving the 56-bit key block and generating the second subkey in accordance with the second clock.

7. The apparatus as recited in claim 6, wherein the first key scheduling means includes:
   a first permutation choice unit for permuting the 56-bit key block;

a first register for storing left 28 bits among the 56-bit key block from the first permutation choice unit in accordance with the first clock;

a second register for storing right 28 bits among the 56-bit key block from the first permutation choice unit in accordance with thee first clock;

two shifters, each for shifting the 28 bits stored in the first and the second registers by a predetermined number of bits; and a second permutation choice unit for permuting the 28 bits stored in the first and the second registers, thereby generating the first subkey.

8. The apparatus as recited in claim 7, wherein the second key scheduling means includes:

a third permutation choice unit for permuting the 56-bit key block;

a third register for storing left 28 bits among the 56-bit key block from the third permutation choice unit in accordance with the second clock;

a fourth register for storing right 28 bits among the 56-bit key block from the third permutation choice unit in accordance with the second clock;

two shifters, each for shifting the 28 bits stored in the third and the fourth registers by a predetermined number of bits; and a fourth permutation choice unit for permuting the 28 bits stored in the third and the fourth registers, thereby generating the second subkey.

* * * * *